United States Patent [19]
Stripinis et al.

[11] Patent Number: 5,152,666
[45] Date of Patent: Oct. 6, 1992

[54] STATOR ASSEMBLY FOR A ROTARY MACHINE

[75] Inventors: Philip S. Stripinis, Rocky Hill; Thomas C. Walsh, New Britain, both of Conn.

[73] Assignee: United Technologies Corporation, Hartford, Conn.

[21] Appl. No.: 695,486

[22] Filed: May 3, 1991

[51] Int. Cl.⁵ .................................... F01D 25/14
[52] U.S. Cl. .................................... 415/178; 415/175; 415/116
[58] Field of Search ............ 415/115, 116, 173.3, 415/175, 176, 177, 178

[56] References Cited

U.S. PATENT DOCUMENTS

| | | | |
|---|---|---|---|
| 2,625,793 | 5/1949 | Mierley et al. | 60/39 |
| 2,639,579 | 6/1949 | Willgoos | 60/35 |
| 3,583,824 | 6/1971 | Smuland et al. | 415/117 |
| 3,966,354 | 6/1976 | Patterson | 415/116 |
| 3,975,901 | 8/1976 | Hallinger et al. | 60/39 |
| 3,986,720 | 10/1976 | Knudsen et al. | 277/26 |
| 4,023,919 | 5/1977 | Patterson | 415/134 |
| 4,213,296 | 7/1980 | Schwarz | 415/116 |
| 4,230,436 | 10/1980 | Davison | 415/1 |
| 4,242,042 | 12/1980 | Schwarz | 415/175 |
| 4,257,222 | 3/1981 | Schwarz | 415/178 |
| 4,303,371 | 12/1981 | Eckert | 415/178 |
| 4,439,982 | 4/1984 | Weiler et al. | 60/39 |
| 4,512,712 | 4/1985 | Baran, Jr. | 415/178 |
| 4,841,726 | 6/1989 | Burkhardt | 60/226 |

FOREIGN PATENT DOCUMENTS

| | | |
|---|---|---|
| 2534982 | 10/1982 | France . |
| 886626 | 1/1962 | United Kingdom . |
| 2025536 | 1/1980 | United Kingdom . |
| 2062117 | 5/1981 | United Kingdom . |

Primary Examiner—Edward K. Look
Assistant Examiner—Michael S. Lee
Attorney, Agent, or Firm—Gene D. Fleischhauer

[57] ABSTRACT

A stator assembly 46 for an axial flow rotary machine 10 is disclosed. Various construction details which increase the efficiency of the machine are developed. In one embodiment, the machine includes a circumferentially continuous structural outer case and a circumferentially continuous inner case which is a pressure vessel for the working medium flow path.

7 Claims, 2 Drawing Sheets

STATOR ASSEMBLY FOR A ROTARY MACHINE

TECHNICAL FIELD

This invention relates to the field of gas turbine engines and more particularly to a stator assembly and a method for cooling the stator assembly in such an engine. Although the invention was developed in the field of gas turbine engines, it is generally applicable to axial flow rotary machines.

BACKGROUND OF THE INVENTION

Axial flow rotary machines of the gas turbine type include a compression section, a combustion section and a turbine section. A flow path for working medium gases extends through the sections of the engine. The working medium gases are compressed in the compression section. The compressed gases are mixed with fuel in the combustion section and burned to add energy to the gases. The hot pressurized gases are expanded through the turbine section.

In the turbine section, the engine is provided with a rotor assembly. The rotor assembly includes a rotor disk and rotor blades which extend outwardly across the working medium flow path. The rotor assembly extracts energy from the gases as the gases pass through the rotor section.

A stator assembly extends circumferentially about the rotor assembly. The stator assembly supports the rotor assembly and provides a pressure vessel to confine the working medium gases to the working medium flow path. Typically, the stator assembly includes an outer case and an inner case which surrounds the hot working medium gases. The inner case supports the arrays of stator vanes and sealing elements such as inner air seals and outer air seals which are in close proximity to the rotor assembly.

As the gases are flowed through the stator assembly, the gases exert aerodynamic loads on the stator vanes. The loads are transmitted from the stator vanes to the inner case causing stresses in the inner case. In addition, the outer air seals and stator vanes are heated by the working medium gases as the gases pass through and over these elements. The heat is transmitted by conduction to the inner case causing uneven heating of the inner case and additional stresses in the inner case which may adversely affect the fatigue life of the inner case.

Cooling air is supplied to the turbine section to cool the inner case. Cooling the inner case decreases thermal gradients in the inner case and the associated thermal stresses in the inner case.

One type of construction for providing a coolable inner case includes circumferentially continuous outer case and a circumferentially segmented inner case. Each segment carries a portion of the arrays of stator vanes and outer air seals. This has the advantage of decreasing thermal stresses in the inner case by interrupting the circumferential continuity of the inner case. But a segmented construction has the disadvantage of requiring a supply of cooling air be at a pressure which is higher than the gas path pressure to avoid hot working medium gases from leaking radially outwardly past the inner case. Once past the inner case, the hot working medium gases have the potential to cause unusually high temperature gradients in the adjacent structure with accompanying high thermal stresses and decreased thermal fatigue life. Leakage of cooling air into the flow path occurs at lower pressure regions of the flow path. Because the high pressure gases must be at a pressure which is higher than the highest pressures in the gas path adjacent the inner case. In addition, these higher pressures require greater amounts of work to compress the cooling gases. The work required to compress the cooling gases reduces the efficiency of the rotary machine.

Another approach is to form the engine of a plurality of circumferentially continuous cases which are joined to each other and which are used to supply the cooling air to the working medium flow path. An example of such a construction is shown in U.S. Pat. No. 4,841,726 entitled "Gas Turbine Jet Engine of Multi-Shaft Double-Flow Construction" issued to Burkhardt. Because the cases are circumferentially continuous, the gases may be supplied at a lower pressure as long as the pressure of the gases is higher than the discharge location adjacent to the hot working medium flow path. This approach increases engine efficiency by decreasing the work of pressurization but results in significant thermal stresses in the inner case as the cases attempt to expand against the structures to which they are rigidly attached.

Accordingly, scientists and engineers working under the direction of Applicants' Assignee have sought to develop a stator assembly having cases which enable the supply of cooling air at pressures lower than the highest pressure in the working medium flow path but avoiding the stresses associated with differences in thermal growth between the inner case and the outer case.

SUMMARY OF THE INVENTION

According to the present invention, a stator assembly includes a circumferentially continuous outer case joined to an adjacent case for carrying structural loads and a circumferentially continuous inner case spaced radially from the outer case to bound a cooling air chamber therebetween; the inner case extending circumferentially to bound the flow path for working medium gases and to support arrays of stator vanes and outer air seals extending into the flow path, the inner case being sealingly fixed at one end to the outer case to support the inner case and to block gases from flowing therebetween and free at the other end to accommodate relative axial and radial growth between the cases.

In accordance with one embodiment of the present invention, the inner case is fixed to the outer case at a first location at which the inner case and outer case are bathed in cooling air to decrease thermal gradients between the inner case and the outer case.

In still another embodiment of the invention, a method of operating a gas turbine engine includes the steps of impinging cooling air against the inner case to cool the inner case and heat the cooling air, flowing the cooling air via passages in the outer case and via a radially extending member to the interior of the engine and impinging the heated cooling air against a rotor disk to heat the rotor disk and decrease thermal gradients in the interior of the rotor disk.

A primary feature of the present invention is a stator assembly having a circumferentially continuous outer case and a circumferentially continuous inner case. Another feature is the upstream end of the inner case. The upstream end of the inner case is fixed to the outer case. Another feature at this location is a cooling air cavity which is adjacent to the inner case and the outer case and a cooling air plenum which is outwardly of the inner case. Another feature is the downstream end of the inner case. At the downstream end, the inner case is spaced radially and axially from the outer case in the installed condition during non-operative conditions. At operative conditions in response to thermal growth, the inner case moves axially and moves radially outwardly into close proximity with the outer case. Another feature is regions of increased thickness of the inner case. These regions of increased thickness are adapted to engage the attachment points of the stator vanes to the outer case. Another feature is a baffle plate which divides the cooling air cavity into a supply manifold and an impingement manifold. The baffle plate has selectively located holes to direct the impingement air against the thickened regions of the inner case which support the arrays of stator vanes and outer air seals.

A primary advantage of the present invention is the engine efficiency which results from using a pressure vessel for an inner case to enable the use of cooling air for the inner case which is at a pressure lower than the highest pressure of the adjacent working medium flow path. Another advantage is the engine efficiency which results from the concentricity of the inner case and the outer air seals positioned by the inner case about the rotor assembly by employing a structural outer case to carry bending loads and a non-structural, sculpted inner case for carrying the outer air seals. Still another advantage is the thermal fatigue life of the inner case and the outer case which results from bathing the point attachment of the inner case to the outer case in cooling air to decrease thermal stresses at that end of the inner case and allowing the other end of the inner case to grow radially and axially with respect to the outer case to accommodate differences in thermal growth between the inner case and the outer case and decrease the resulting thermal stresses. In one embodiment, an advantage is the engine efficiency and fatigue life of the rotor assembly which results from collecting the heated cooling air from the inner case and ducting the cooling air to the interior of the engine to use the heated cooling air to heat the inward portion of the rotor disk to decrease thermal gradients in the rotor disk and the associated thermal stresses.

The foregoing features and advantages of the present invention will become more apparent in light of the following detailed description of the best mode for carrying out the invention and in the accompanying drawings.

BEST MODE FOR CARRYING OUT THE INVENTION

Figure 1:
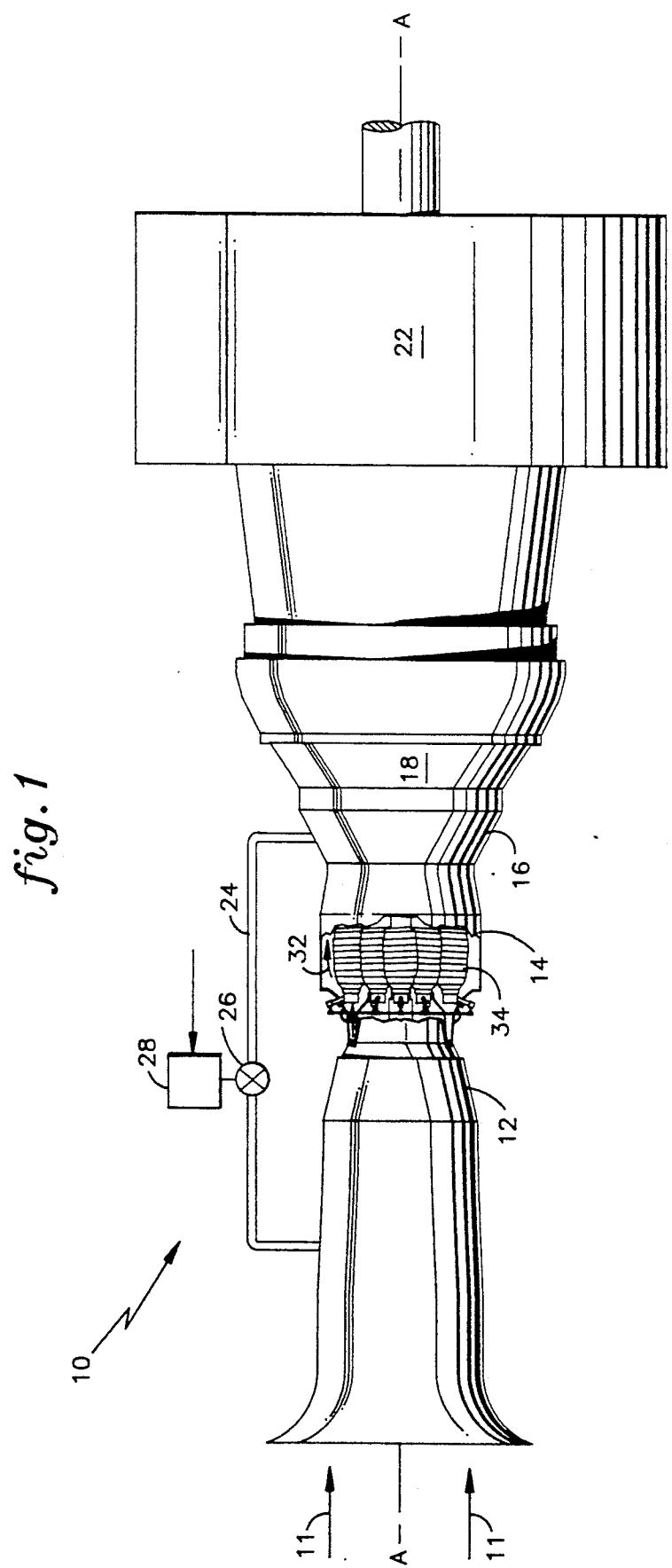
FIG. 1 is a side elevation view of an axial flow rotary machine with a portion of the engine broken away for clarity.

FIG. 1 is a side elevation view of an axial flow rotary machine 10 illustrating one embodiment of the present invention. The particular engine shown is an axial flow gas turbine engine having an annular flow path 11 for working medium gases.

The engine includes a compression section 12, a combustion section 14 and a turbine section 16. The turbine section includes a power turbine 18 and a free turbine 22 for extracting energy from the working medium gases. A conduit 24 for compressed gases from the compression section of the engine places the compression section in flow communication with the turbine section of the engine. A valve 26 controls the flow of these gases and is responsive via control means 28, such as an electronic engine control, to engine parameters. A second flow path 32 for cooling air extends through the combustion section around the combustion chambers 34.

Figure 2:
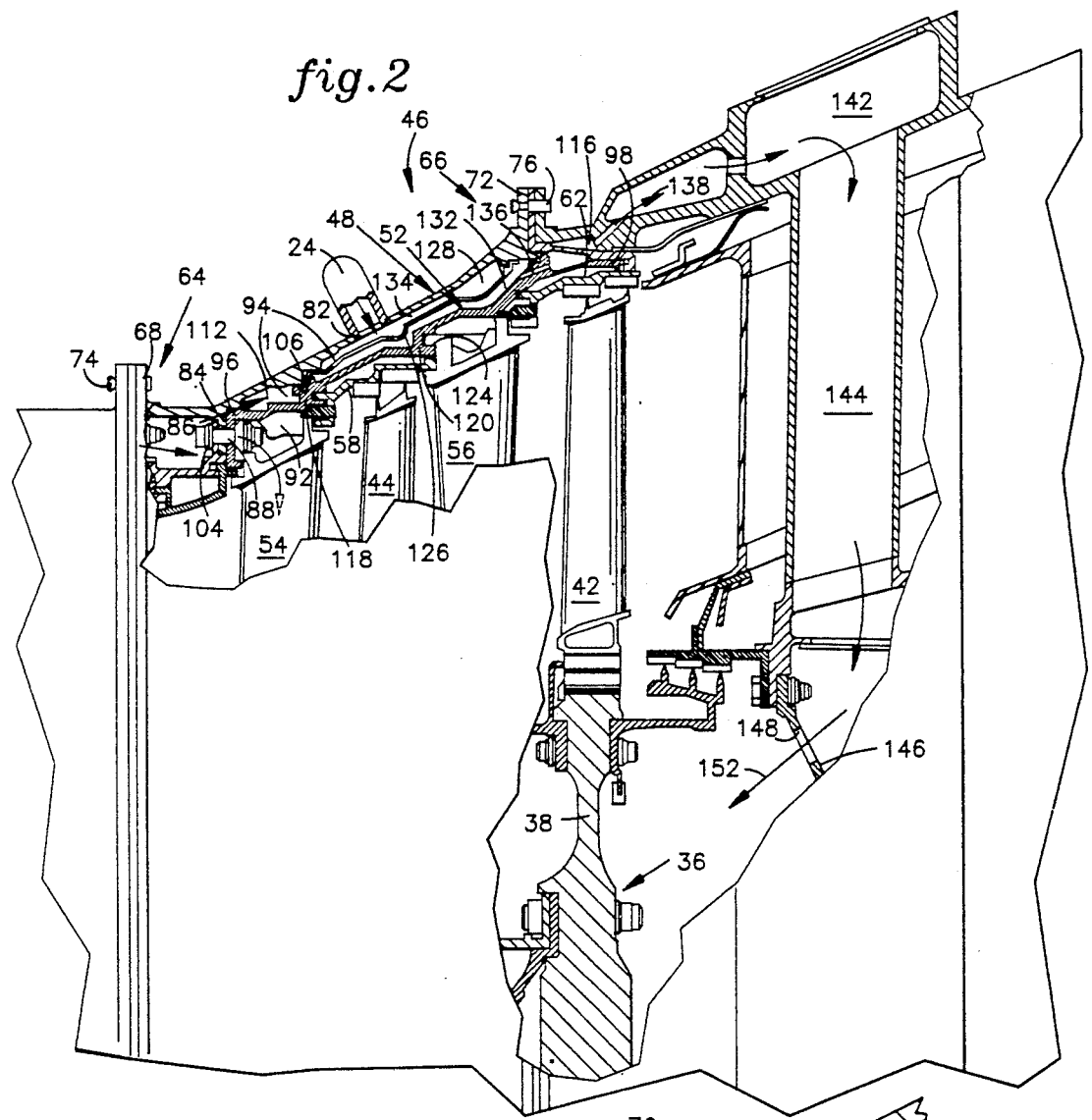
FIG. 2 is a side elevation view of a portion of the turbine section of the rotary machine shown in FIG. 1, partly in section and partly in full, to show the relationship of the inner case to the outer case.

FIG. 2 is an enlarged cross-sectional view of a portion of the turbine section 18 of the engine. The turbine section includes a rotor assembly 36 which is disposed about the axis A of the engine. The rotor assembly includes a rotor disk 38 and arrays of rotor blades, as represented by the rotor blade 42 and rotor blade 44, which extend radially outwardly across the working medium flow path.

A stator assembly 46 extends circumferentially about the rotor assembly 36 to bound the working medium flow path. The stator assembly includes a structural outer case 48 and a non-structural inner case 52. The inner case supports and positions arrays of stator vanes, as represented by the stator vane 54 and the stator vane 56, which extend inwardly across the working medium flow path into close proximity with the rotor assembly 36. The inner case also supports and positions arrays of outer air seals, as represented by the outer air seal 58 and the outer air seal 62, which are disposed circumferentially about the arrays of rotor blades. Each outer air seal is in close proximity to the rotor blades to block the leakage of working medium gases past the outer air seals.

The structural outer case 48 extends axially and circumferentially about the axis of the engine. The outer case is circumferentially continuous. The outer case has an upstream end 64 and a downstream end 66. Each of these ends is adapted by flanges 68, 72 to engage the adjacent stator structure. Pluralities of nut and bolt assemblies, as represented by the assembly 74 and the assembly 76, extend through the outer case to attach and fix the outer case to the adjacent stator structure. The outer case is the main structural member of the engine and resists bending loads imposed on the engine during operative conditions.

The outer case 48 is disposed in relatively cool air, such as the ambient air about the engine, and is cooled on its exterior by being bathed in the ambient air. The outer case also has local openings, as represented by the opening 82, which extend through the outer case. The local openings adapt the outer case to be in flow communication with the source of pressurized cooling air via the conduit 24.

The outer case includes an inwardly extending flange 84 adjacent to the upstream end 64 of the outer case. The inwardly extending flange adapts the outer case to engage the inner case 52. The flange is spaced axially from the upstream end of the outer case leaving a first cooling air cavity 86 therebetween. The first cooling air cavity is in flow communication with a source of cooling air such as the cooling air flow path 32 which extends through the combustion section 14 shown in FIG. 1.

The inwardly extending flange 84 includes a plurality of holes 88 extending through the flange which adapt the flange to pass cooling air in the downstream direction outwardly of the adjacent array of stator vanes 54. A vane cooling air supply region 92 is disposed between the vanes 54 and the inner case 52.

The non-structural inner case 52 is also part of the stator assembly. The inner case is circumferentially continuous and acts as a pressure vessel for the working medium flow path 11. The inner case extends axially with respect to the outer case 48 and is spaced radially inwardly from the outer case leaving a second cooling air cavity 94 therebetween.

The inner case has an upstream end 96 and a downstream end 98. The downstream end is spaced radially and axially from the outer case 48 in the installed condition, having a clearance gap $G_a$ and $G_r$ therebetween. The downstream end 98 is free to grow radially and axially until the inner case contacts the outer case.

The upstream end 96 is fixedly attached to the upstream flange 84 of the outer case. In the example shown, a plurality of nut and bolt assemblies 104 extend through the upstream flange of the outer case and the upstream end 96 of the inner case. The fasteners secure the inner case to the outer case against axial and radial movement of the inner case with respect to the outer case. The inner case extends as a cantilever from the outer case because the downstream end 98 of the inner case is free to move axially and radially with respect to the outer case in the installed condition.

The inner case includes a first surface 106 and a second surface 108 disposed between the upstream end 96 and the downstream end 98 of the inner case. The surfaces sealingly engage the outer case 48 under operative conditions by expanding outwardly in response to thermal growth to divide the cooling air cavity into a first plenum 112, a second plenum 114 and a third plenum 116. The first plenum is in flow communication with the first cavity 86 upstream of the upstream flange 84 of the outer case through the holes 88 in the flange or in the bolts 104. The second plenum is in flow communication with a source of cooling air via the conduit 24. The third plenum 116 collects spent cooling air after the air is impinged against the inner case 52.

The inner case 52 has a plurality of sections 118, 120, of increased radial thickness in comparison to the adjacent sections. These sections of increased thickness are adapted by circumferentially extending grooves, such as the groove 124, to engage the stator vanes 54, 56 and the outer air seals 59, 62. These sections receive heat from the stator vanes and outer air seals. The sections are selectively cooled by impinging air in these locations of the inner case.

A baffle plate 126 is disposed in the second plenum 114 between the inner case 52 and the outer case 48. The baffle plate divides the second plenum into a supply manifold 128 and into an impingement manifold 132. A plurality of impingement holes 134 are aligned with the sections of increased radial thickness which engage the stator vanes and outer air seals. The impingement holes 118, 120, 122 impinge cooling air at these critical locations of the attachment points of the stator vane and outer air seals to the inner case.

The third plenum 116 is in flow communication with the impingement manifold 132 via a plurality of holes as represented by the hole 136. Thus, the third plenum acts as a plenum for collecting cooling air exhausted from the impingement manifold after the cooling air is flowed radially inwardly to receive heat from the inner case.

The plenum 116 is in flow communication via a series of passages 138 in the outer case 48 with a circumferentially extending manifold 142. A plurality of hollow members 144 extend radially inwardly across the working medium flow path 11 into proximity with a structural member 146. An opening 148 in the member provides a flow path 152 for discharging cooling air (which has been heated by impingement against the inner case) against the inner portion of the adjacent rotor disk 36. The cooling air heats the rotor disk to decrease thermal gradients in the rotor disk between the inner diameter of the rotor disk and the outer diameter which is adjacent to the working medium flow path 11.

Figure 3:
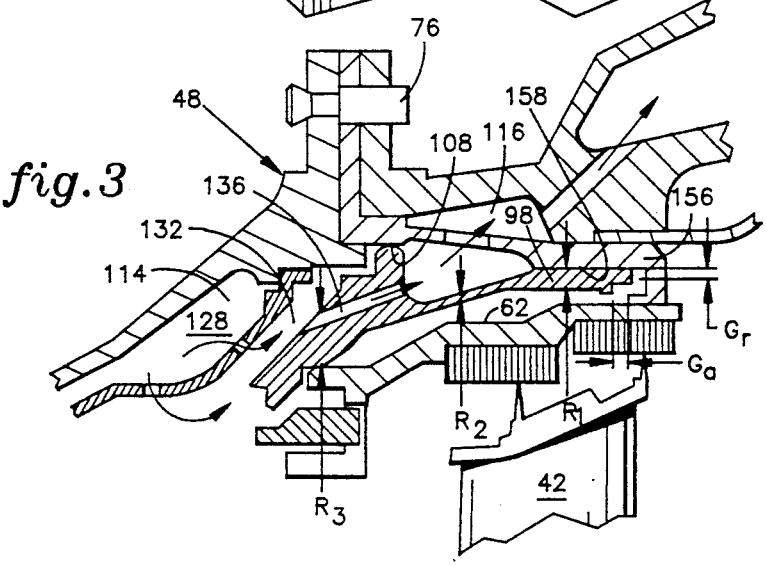
FIG. 3 is an enlarged view of a portion of FIG. 2 showing the downstream end of the inner case.

FIG. 3 is an enlarged view of a portion of the turbine section 18 shown in FIG. 2 showing in more detail the downstream end 98 of the inner case 52. As shown in FIG. 3, the outer case 48 includes a flange 156 which extends radially inwardly having a groove 158. The groove adapts the flange to engage the inner case 48 under operative conditions. In the non-operative condition, the downstream end of the inner case is spaced axially by the gap $G_a$ and radially by the gap $G_r$ from the surface of the groove. Under operative conditions the inner case expands radially outwardly to engage the surface of the groove 158 to block the leakage of cooling air in the radially inward direction toward the outer air seal and thence to the working medium flow path.

The downstream end 98 of the inner case 48 has a first section having a first radial thickness $R_1$. A second section is spaced axially upstream from the first section. The second section has a second radial thickness $R_3$ which is greater than the first radial thickness $R_1$. A third section extends between the first section and the second section. The third section has a radial thickness $R_2$ which is less than one half ($\frac{1}{2}$) of the first radial thickness $R_1$ or the second radial thickness $R_3$. The third section is relatively compliant in the radial direction in comparison to the adjacent sections to permit a degree of radial compliance between the first section $R_1$ and the surface of the groove 158 on the outer case under operative conditions at which the inner case expands outwardly to the outer case.

During operation of the gas turbine engine 10 shown in FIG. 1, working medium gases are flowed along the working medium flow path 11. The gases are compressed in the compression section 12 to raise the pressure of the gases. The gases are flowed into the combustion section 14 where the gases are mixed with fuel and burned to add energy to the gases. The hot working medium gases are expanded through the turbine section 16, 18 where the gases exert circumferential forces on the rotor blades and the stator vanes. The gases also lose heat to the stator vanes 54, 56 and the outer air seals 58, 62 by heat transfer.

Heat is transferred by conduction through the stator vanes 54, 56 and the outer air seals 58, 62 to the inner case 52. Cooling air is flowed via the first cavity 86 to locations inwardly of the inner case adjacent the stator vane and outwardly of the inner case in the first plenum.

Cooling air is also flowed from the compression section 12 via the conduit 24. The flow of cooling air is regulated by the control valve 26 and control means 28 in response to operating parameters of the engine. The cooling air enters the supply manifold 128 which extends circumferentially about the engine outwardly of the baffle plate 126. The cooling air is at a pressure which is less than the pressure of the working medium flow path 11 at the upstream end of the turbine section and at a pressure which is greater than the pressure of the working medium flow path at the downstream end of the turbine section. Cooling air is flowed from the supply manifold, the baffle plate across the impingement manifold and to critical locations of the inner case.

The inner case acts as a pressure vessel isolating the second plenum from the working medium flow path. As a result, the pressure of the cooling air exiting the second plenum needs only be higher than the pressure in the working medium flow path adjacent the region 116 where the inner case is free to move with respect to the outer case. This enables the pressure to be lower than the pressure of the working medium flow path at the entrance to the turbine section increases engine efficiency by not requiring as much work to compress the cooling air.

The cooling air passing through the first cavity 86 and then to the first plenum 112 bathes both the inner case and the outer case in cooling air. Finally, the vane region 92 provides cooling air to the interior of the inner case. In addition, the outer case is cooled by ambient air in contact with the outer case. As a result the temperature of the inner case and the outer case at the point of joinder of the inner case the outer case is very small greatly reducing the thermal stresses and increasing the fatigue life of the inner case.

As mentioned, the downstream end of the inner case is free to move radially and axially with respect to the outer case decreasing thermal stresses in the outer case as the engine moves from the non-operative to the operative condition. Thermal stresses are also reduced by the flexibility of the end of the inner case by reason of the reduced thickness of the third section $R_3$ between the first section $R_1$ and the second section $R_2$ of the inner case.

Finally, the second plenum 114 acts as a heat exchanger transferring heat from the inner case 52 to the cooling air. The cooling air has sufficient pressure to be ducted downstream and radially inwardly into the turbine section 16 where the air is impinged on the inner portion of the rotor disk 36 to decrease thermal gradients in the rotor disk.

Although the invention has been shown and described with respect to detail embodiments thereof, it should be understood by those skilled in the art that various changes in form and detail thereof may be made without departing from the spirit and scope of the claimed invention.

We claim:

1. An axial flow, rotary machine having a flow path for working medium gases extending through the machine and a stator assembly which extends circumferentially about the flow path to bound the working medium flow path, the stator assembly including arrays of stator vanes which extend inwardly and arrays of outer air seals, which comprises:
    a structural outer case which extends axially and circumferentially about the axis of the machine, the outer case being circumferentially continuous and having
        an upstream end and an downstream end which are attached to adjacent structure of the stator assembly,
        an inwardly extending element adjacent to one of the ends of the outer case which adapts the outer case to engage an inner case,
        a first cooling air cavity adjacent to the element which is in flow communication with a source of cooling air; and,
    a non-structural inner case which is circumferentially continuous and extends axially with respect to the outer case and is spaced radially inwardly from the outer case leaving a second cooling air cavity therebetween, the inner case having
        a first end and a second end, the first end being fixed to the element of the outer case, the second end in the installed, non-operative condition being spaced axially from the outer case and being spaced radially inwardly from the outer case, and being free to move radially and axially at least a minimum amount with respect to the outer case;
    wherein the cooling air from the first cavity and from the second cavity cool the inner case and the outer case at the location of joinder between the cases to decrease non-uniformities in temperature between the outer case and inner case to decrease relative thermal growth therebetween and resulting thermal stresses, wherein the downstream end of the inner case is free to move axially and radially with respect to the outer case to accommodate differences in thermal growth and stresses that result from the circumferentially continuous nature of the case, and wherein the circumferentially continuous inner case is a pressure vessel for the working medium gases and makes possible supplying cooling air from a source of cooling air at a pressure which is less than the maximum pressure of the working medium gases adjacent the inner case which decreases the difference in pressure between the spent cooling gases and the gas path while avoiding the need to supply the cooling air at pressures above the gas path pressure at all locations.

2. The axial flow, rotary machine of claim 1 which further includes a vane cavity region outwardly of an array of stator vanes and inwardly of the inner case and adjacent to the element in the outer case, the vane cavity being in flow communication with a cooling air cavity to provide additional cooling to the inner case adjacent to the location of joinder to the outer case.

3. The invention as claimed in claim 1, wherein
    a baffle plate is disposed in the second cavity between the inner case and the outer case to divide the second cavity into a supply manifold and an impingement manifold, the baffle plate having a plurality of impingement holes aligned with the inner case; and wherein a plenum is located downstream of the impingement cavity collecting cooling air exhausted from the impingement manifold after the cooling air is flowed radially inwardly to receive heat from the inner case and wherein the plenum is in flow communication with a rotor assembly for discharging cooling air, which has been heated by impingement against the inner case, against the inner portion of a rotor disk to heat the rotor disk to decrease thermal gradients in the rotor disk between the outer diameter and the inner diameter of the rotor disk.

4. An axial flow, rotary machine having a flow path for working medium gases extending through the machine, the rotary machine including a rotor assembly disposed about the axis of the engine which has a rotor disk and rotor blades which extend radially outwardly across the working medium flow path and a stator assembly extending circumferentially about the rotor assembly to bound the working medium flow path, the stator assembly including arrays of stator vanes which extend inwardly into close proximity with the rotor assembly and arrays of outer air seals outwardly of the rotor assembly, which comprises:

a structural outer case which extends axially and circumferentially about the axis of the machine, the outer case being circumferentially continuous and having an upstream end and an downstream end which are attached to adjacent structure of the stator assembly, at least one opening extending through the outer case which is adapted to place the outer case in flow communication with a source of pressurized cooling air, an inwardly extending flange adjacent to the upstream end which adapts the outer case to engage an inner case, the flange being spaced axially from the upstream end of the outer case leaving a first cooling air cavity therebetween in flow communication with a source of cooling air, the flange including a plurality of holes extending therethrough which adapt the flange to pass cooling air in the downstream direction; and, a non-structural inner case which is circumferentially continuous and extends axially with respect to the outer case and is spaced radially inwardly from the outer case leaving a second cooling air cavity therebetween, the inner case having an upstream end and a downstream end, the upstream end being fixed to the upstream flange of the outer case, the downstream end being free to move axially and radially with respect to the outer case at least a minimum amount and in the installed, non-operative condition being spaced axially form the outer case and being spaced radially from the outer case, a first surface disposed between the upstream end and the downstream end which sealingly engages the outer case to divide the cooling air cavity into a first plenum and a second plenum, the first plenum being in flow communication with the first cavity through the holes in the flange and the second plenum being in flow communication with a source of cooling air; and a plurality of sections of increased radial thickness, each of which adapt the inner case to engage the stator vanes and the outer air seals;

a baffle plate disposed in the second plenum between the inner case and the outer case to divide the second plenum into a supply manifold and an impingement manifold, the baffle plate having a plurality of impingement holes aligned with the flanges which engage the attachment points of the stator vanes and the outer air seals to the inner case; wherein cooling air from the first cavity and from the first plenum and on the exterior of the outer case cool both the inner and outer sides of the upstream end of the inner case and the outer case at the location of joinder of the inner case to the outer case to decrease non-uniformities in temperature between the outer case and inner case to decrease relative thermal growth therebetween and the resulting thermal stresses, wherein the downstream end of the inner case is free to move axially and radially with respect to the outer case to accommodate differences in thermal growth and stresses that result from the circumferentially continuous nature of the case, and wherein the circumferentially continuous inner case is a pressure vessel for the working medium gases and makes possible supplying cooling air from a source of cooling air at a pressure which is less than the maximum pressure of the working medium gases adjacent the inner case which decreases the difference in pressure between the discharged cooling gases and the gas path while avoiding the need to supply the cooling air at pressures above the gas path pressure at all locations.

5. The axial flow rotary machine as claimed in claim 4, wherein the inner case moves radially outwardly in response to operative temperatures to engage the outer case under operative conditions.

6. The axial flow, rotary machine as claimed in claim 4 wherein the downstream end has a first section of first radial thickness $R_1$, a second section spaced axially upstream from the first section having a second radial height $R_2$, and a third section extending therebetween having a radial height which is less than one half ($\frac{1}{2}$) of the first radial height $R_1$ and the second radial height $R_2$ to introduce a flexible section therebetween.

7. The invention as claimed in claim 5, wherein the inner case has a second surface extending radially outwardly into proximity with the outer case to form a third plenum therebetween for collecting cooling air exhausted from the impingement manifold after the cooling air is flowed radially inwardly to receive heat from the inner case and wherein the plenum is in flow communication via a series of passage ways in the outer case and thence with a radially extending member extending radially inwardly across the working medium flow path into proximity with the rotor assembly for discharging cooling air, which has been heated by impingement against the inner case, against the rotor disk to heat the rotor disk to decrease thermal gradients in the rotor disk between the outer diameter and the inner diameter of the rotor disk.

* * * * *